US008630037B1

(12) United States Patent
Osterman et al.

(10) Patent No.: US 8,630,037 B1
(45) Date of Patent: Jan. 14, 2014

(54) OPTICAL SHUTTER FOR DAY-NIGHT FILTER OPERATION

(71) Applicants: LC-TEC Displays AB, Borlange (SE); HT, Inc., Seoul (KR)

(72) Inventors: Jesper Osterman, Falun (SE); Se Jin Kang, Seoul (KR); Terry J. Scheffer, Hilo, HI (US)

(73) Assignees: L-C TEC Displays AB, Borlänge (SE); HT, Inc., Seoul (KR)

( * ) Notice: Subject to any disclaimer, the term of this patent is extended or adjusted under 35 U.S.C. 154(b) by 0 days.

(21) Appl. No.: 13/767,533

(22) Filed: Feb. 14, 2013

(51) Int. Cl.
*G02B 5/30* (2006.01)
*G02B 5/28* (2006.01)
*G02B 5/20* (2006.01)

(52) U.S. Cl.
CPC ............... *G02B 5/281* (2013.01); *G02B 5/208* (2013.01); *G02B 5/3058* (2013.01)
USPC ............................ 359/352; 359/350; 359/589

(58) Field of Classification Search
USPC .......... 359/350–361, 484.08–484.09, 485.05, 359/487.03, 491.01, 589
See application file for complete search history.

(56) References Cited

U.S. PATENT DOCUMENTS

| 4,679,068 | A * | 7/1987 | Lillquist et al. ............... 348/33 |
| 5,208,688 | A * | 5/1993 | Fergason et al. ............... 349/14 |
| 7,001,068 | B2 * | 2/2006 | Howard ....................... 374/161 |
| 7,391,008 | B2 * | 6/2008 | Fouquet et al. ............... 250/226 |
| 8,411,146 | B2 * | 4/2013 | Twede ......................... 348/148 |
| 2005/0141117 | A1 | 6/2005 | Kim et al. |

* cited by examiner

*Primary Examiner* — Thong Nguyen
(74) *Attorney, Agent, or Firm* — Stoel Rives LLP

(57) ABSTRACT

A near-infrared (NIR) optical shutter comprises a multiple-bandpass filter that is characterized by a bandstop filter region located between first and second bandpass filter regions. The first bandpass filter region passes visible light; the bandstop filter region blocks NIR light of wavelengths within a NIR light sensor band region; and the second bandpass filter region passes NIR light of longer wavelengths than a longer wavelength boundary of the NIR light sensor band region. A polarization state changer positioned between NIR polarizing filters and optically associated with the multiple-bandpass filter causes visible light transmission selectively in first and second light states. The polarization state changer in the first light state causes substantially reduced optical shutter transmission of NIR light in the second bandpass filter region and in the second light state causes substantially increased optical shutter transmission of NIR light in the second bandpass filter region.

13 Claims, 4 Drawing Sheets

US 8,630,037 B1

OPTICAL SHUTTER FOR DAY-NIGHT FILTER OPERATION

COPYRIGHT NOTICE

© 2013 LC-TEC Displays AB and HT, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This application relates to controllable optical filters implemented in optical equipment and, in particular, to near-infrared (NIR) optical shutters for use in daytime and nighttime operation of optical instruments.

BACKGROUND INFORMATION

Most surveillance cameras use a mechanically movable optical filter system that is constructed to selectively block focus-distorting wavelengths of light from impinging on the sensor of the camera. During daytime operation, in which there is strong ambient light, an optical filter passing visible light is mechanically positioned in front of the light sensitive surface of the sensor to reduce image-degrading focus distortion that would arise in response to incident infrared light. During nighttime operation, in which there is weak ambient light, an optical filter passing infrared light is mechanically positioned in front of the light sensitive surface of the sensor to enable use of infrared light to produce an image. A mechanized optical filter switching apparatus for use in an optical instrument is described in U.S. Patent Application Pub. No. US 2005/0141117 A1 of Kim et al.

What is needed is an optical shutter that, in absence of mechanical motion, selectively blocks NIR light wavelengths from reaching the sensor of the camera during daytime operation.

SUMMARY OF THE DISCLOSURE

A near-infrared optical shutter configured for use with an optical instrument receives light in visible and near-infrared wavelength regions of the electromagnetic radiation spectrum. The optical instrument includes a light detection sensor that is characterized by spectral light sensitivity in which a near-infrared light sensor band region has a shorter wavelength boundary and a longer wavelength boundary. The shorter wavelength boundary is located adjacent the visible light region of the electromagnetic radiation spectrum. The optical instrument is preferably a digital camera, and the light detection sensor preferably includes a charge-coupled device image sensor.

The optical shutter comprises a multiple-bandpass filter that is characterized by a bandstop filter region located between a first bandpass filter region and a second bandpass filter region. The first bandpass filter region passes visible light wavelengths; the bandstop filter region blocks near-infrared light of wavelengths within the near-infrared light sensor band region; and the second bandpass filter region passes near-infrared light of longer wavelengths than the wavelength of the longer wavelength boundary of the near-infrared light sensor band region.

First and second near-infrared polarizing filters that are tuned to pass visible light wavelengths in the first bandpass filter region and near-infrared light wavelengths in the second bandpass filter region are positioned on either side of a polarization state changer. The polarization state changer is optically associated with the multiple-bandpass filter and is responsive to a control signal to provide selectively one of a first light state and a second light state. The polarization state changer in the first light state causes transmission of visible light wavelengths in the first bandpass filter region and substantially reduced transmission of near-infrared light wavelengths in the second bandpass filter region from the optical shutter. The polarization state changer in the second light state causes transmission of visible light wavelengths in the first bandpass filter region and substantially increased transmission of near-infrared light wavelengths in the second bandpass filter region from the optical shutter.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
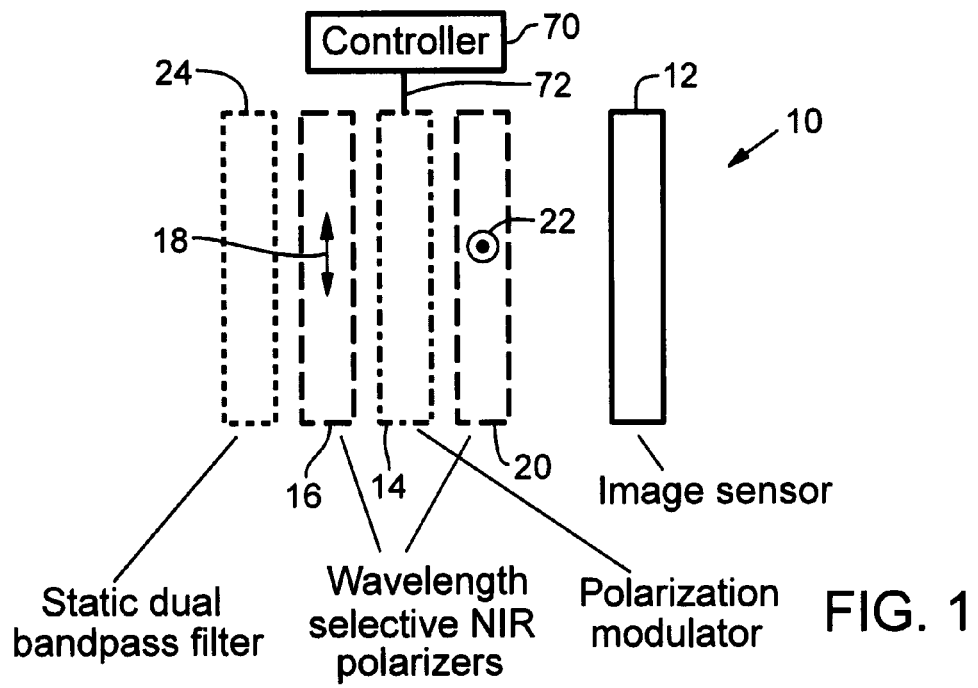
FIG. 1 is a diagram showing the optical components of a preferred optical shutter positioned in front of a charge-coupled device (CCD) camera to produce images from light propagating from the optical shutter.

FIG. 1 is a diagram showing in optical series arrangement the optical components of a near-infrared (NIR) optical shutter 10 that is configured for imaging applications in daytime and nighttime operations. A light detection sensor 12 preferably of a charge-coupled device (CCD) camera type receives light propagating from optical shutter 10 to form images for use in, for example, full motion video surveillance. Optical shutter 10 includes a polarization state changer 14 positioned between a first wavelength selective NIR polarizer 16 transmitting polarized NIR light along a light transmission axis 18 and a second wavelength selective NIR polarizer 20 transmitting NIR light along a light transmission axis 22. A multiple-bandpass filter 24 is positioned adjacent NIR polarizer 16, and CCD camera 12 is positioned adjacent NIR polarizer 20. Multiple-bandpass filter 24 and NIR polarizer 20 function as, respectively, the light entrance component and the light exit component of optical shutter 10. Descriptions of the construction and function of optical components 14, 16, 20, and 24 are set forth in detail below.

Figure 2:
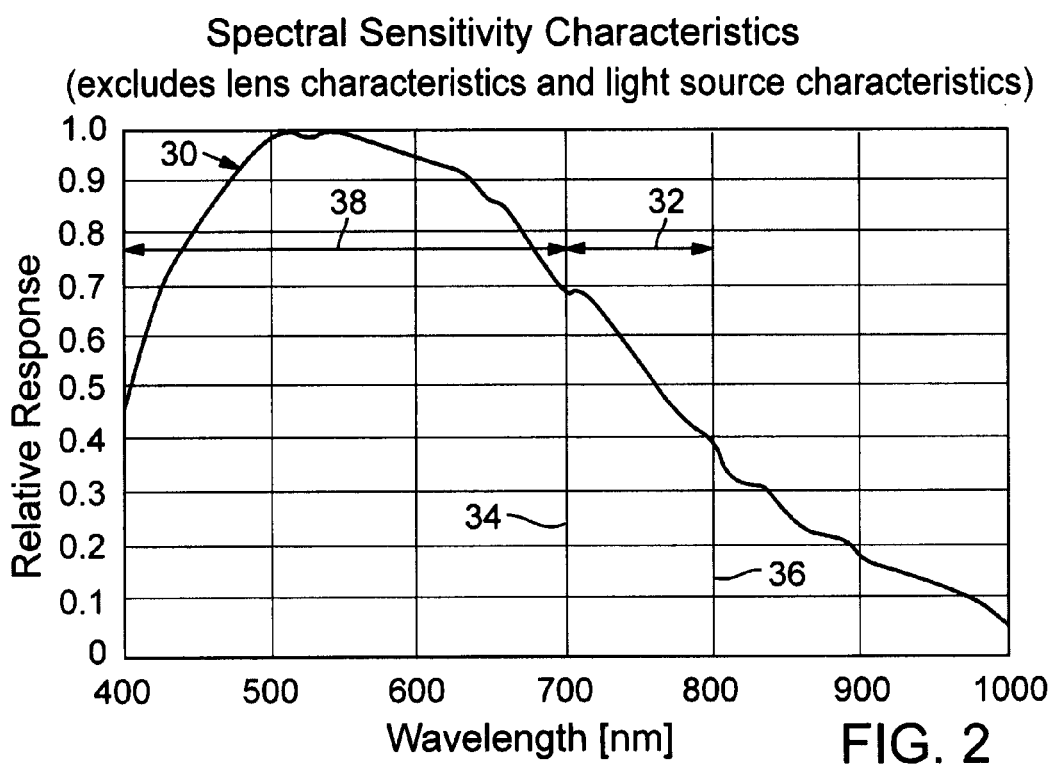
FIG. 2 is a graph of typical spectral sensitivity characteristics of the CCD camera shown positioned in FIG. 1 to receive light propagating from the optical shutter.

FIG. 2 is a graph showing a typical spectral sensitivity curve 30 of CCD camera 12. FIG. 2 represents the spectral sensitivity characteristics of a Model ICX285AL CCD device available from Sony Corporation. Spectral sensitivity curve 30 includes an NIR light sensor band region 32 having a shorter wavelength boundary 34 of about 700 nm and a longer wavelength boundary 36 of about 800 nm. NIR light sensor band region 32 is located adjacent a visible light region 38 of between about 400 nm and about 700 nm. NIR light sensor band region 32 represents in strong daytime ambient light conditions a source of sensor noise that is insufficiently suppressed by wavelength selective NIR filters 16 and 20 and, therefore, adversely impacts the contrast ratio of optical shutter 10. The light polarization characteristics of first NIR polarizer 16 and second NIR polarizer 20 are not sufficient in the 700 nm-800 nm light to prevent it from passing through optical shutter 10 and reaching CCD camera 12.

Figure 3:
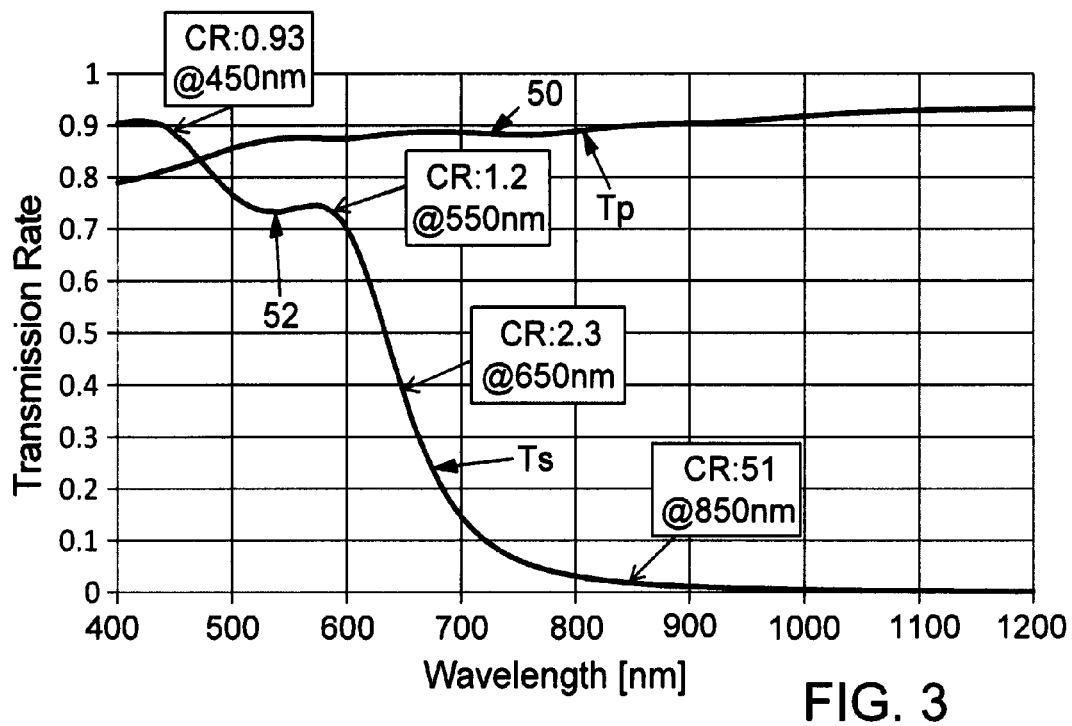
FIG. 3 is a graph of light transmittance as a function of wavelength for each of the S- and P-polarization states of the wavelength selective NIR polarizer components of the optical shutter of FIG. 1.

FIG. 3 is a graph characterizing a wavelength selective NIR polarizing filter of a wire-grid type used as first NIR polarizer 16 and second NIR polarizer 20. (In FIG. 3, "CR" indicates the contrast ratio at the light wavelength indicated.) The wavelength selective polarizing filter polarizes NIR light but not visible light. A preferred NIR polarizing filter is a WGF™ wire grid polarizing film, available from Asahi Kasei E-Materials Corp., Tokyo, Japan. With reference to FIG. 3, the NIR polarizing filter has a light transmission curve 50 (Tp) that is relatively constant for visible and NIR light wavelengths in the P-polarization direction and a light transmission curve 52 that decreases with higher wavelengths in the S-polarization direction. Light transmission curve 52 (Ts) shows non-ideal polarizer properties exhibiting insufficient suppression of NIR light transmission in the 700 nm-800 nm range. This appreciable leakage of light would result in presence of sensor noise in daylight operation of optical shutter 10.

Figure 4:
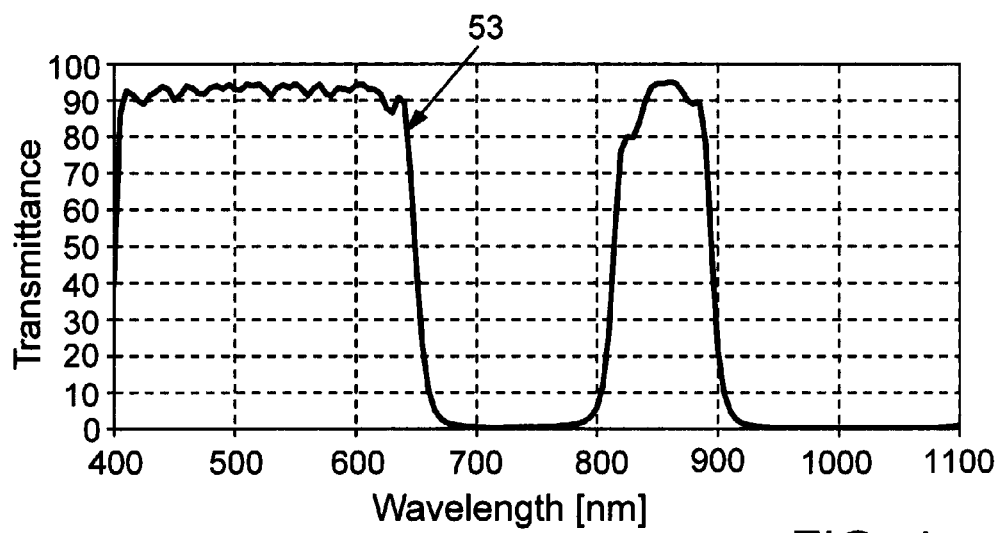
FIG. 4 is a graph of light transmittance as a function of wavelength for a preferred multiple-bandpass filter component of the optical shutter of FIG. 1.

FIG. 4 is a graph characterizing a light transmittance profile 53 of multiple-bandpass filter 24, which is placed in optical shutter 10 to remedy the insufficient suppression of sensor noise in the 700 nm-800 nm light sensor band region. A preferred multiple-bandpass filter 24 exhibiting light transmittance profile 53 is a Model Reference KJ106084-6501R dual bandpass filter, available from Keting Optical Technology, Inc., Hangzhou, PRC. The purpose of multiple-bandpass filter 24 is to match desired transmittance properties at nighttime operation with minimum leakage in the 700 nm-800 nm region resulting from non-ideal polarizer properties. Multiple-bandpass filter 24 implemented in optical shutter 10 for imaging applications is a static dual bandpass filter. Dual bandpass filter 24 is characterized by a first bandpass filter region 54 passing visible light wavelengths and a second bandpass filter region 56 passing NIR light of longer wavelengths than the 800 nm longer-wavelength boundary 36 of NIR light sensor band region 32. A bandstop filter region 58 blocks NIR light wavelengths within the 700 nm-800 nm light sensor band region 32 to prevent their incidence on first NIR polarizer 16 and thereby prevent their transmission through optical shutter 10. Dual bandpass filter 24 transmits, therefore, visible light wavelengths and NIR light wavelengths within a range of between about 800 nm and about 900 nm.

Figure 5A:
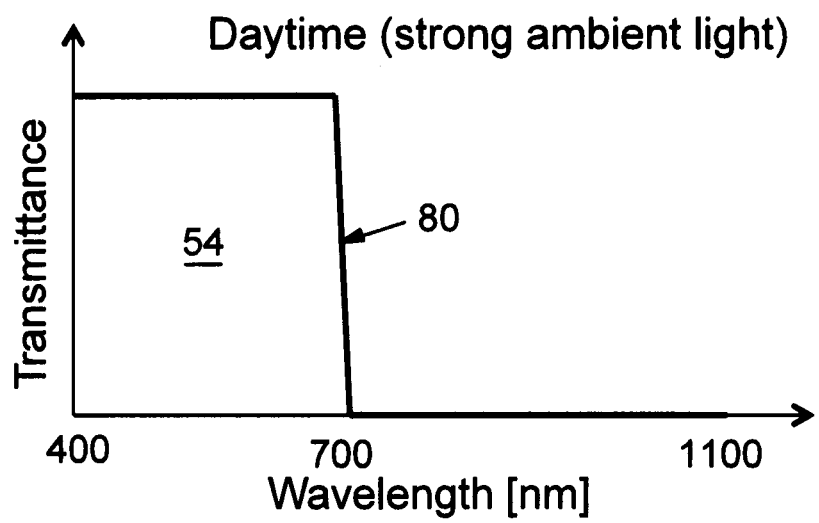
FIGS. 5A and 5B show optical response transmittance properties of the optical shutter of FIG. 1 in, respectively, a closed light state for daytime operation and an open light state for nighttime operation.
Figure 5B:
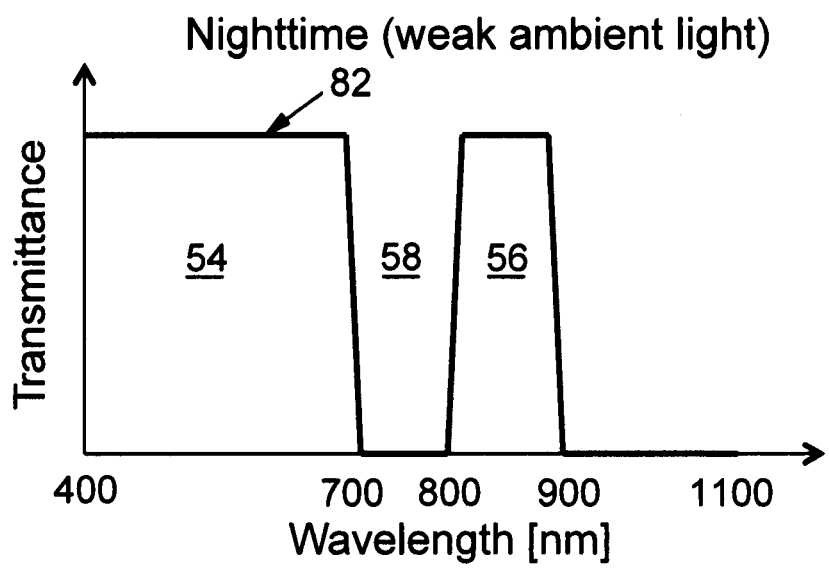

FIGS. 5A and 5B show the optical response transmittance properties of optical shutter 10 in, respectively, a first or closed light state for daytime operation and a second or an open light state for nighttime operation. The closed and open light states are selectively produced by application of a control signal to polarization state changer 14. With reference to FIG. 1, a preferred embodiment of optical shutter 10 is composed of a polarization state changer 14 of a 90°-twisted nematic liquid crystal device tuned for the first minimum condition at 850 nm, the center wavelength of second bandpass filter region 56. (The first minimum condition is met when the product of the liquid crystal birefringence times the cell gap divided by the light wavelength equals one-half the square root of 3.) Twisted nematic liquid crystal device 14 receives from a controller 70 a control signal 72 that switches selectively between a first voltage amplitude of 5 volts AC to provide the closed light state and a second voltage level of zero volts to provide the open light state. NIR polarizers 16 and 20 have respective light transmission polarization axes 18 and 22 that are orthogonally aligned relative to each other. Alternatively, light transmission polarization axes 18 and 22 could be aligned parallel to each other, and a first voltage amplitude of 0 volts AC would provide the closed light state and a second voltage amplitude of 5 volts AC would provide the open state.

With reference to FIG. 5A, control signal 72 providing the closed light state produces an optical response characteristic 80 in which 400 nm-700 nm visible light exits NIR polarizer 20 for incidence on CCD camera 12. With reference to FIG. 5B, control signal 72 providing the open light state produces an optical response characteristic 82 in which 400 nm-700 nm visible light and 800 nm-900 nm NIR light exit NIR polarizer 20 for incidence on CCD camera 12. In operation, optical shutter 10 is always open to transmit 400 nm-700 nm visible light, always closed to block 700 nm-800 nm and 900 nm-1100 nm NIR light, and selectively blocks 800 nm-900 nm NIR light for daytime operation and transmits 800 nm-900 nm NIR light for nighttime operation. Thus, the 800 nm-900 nm NIR light set by second bandpass filter region 56 of dual bandpass filter 24 is in the switchable light wavelength region of optical shutter 10.

Figure 6:
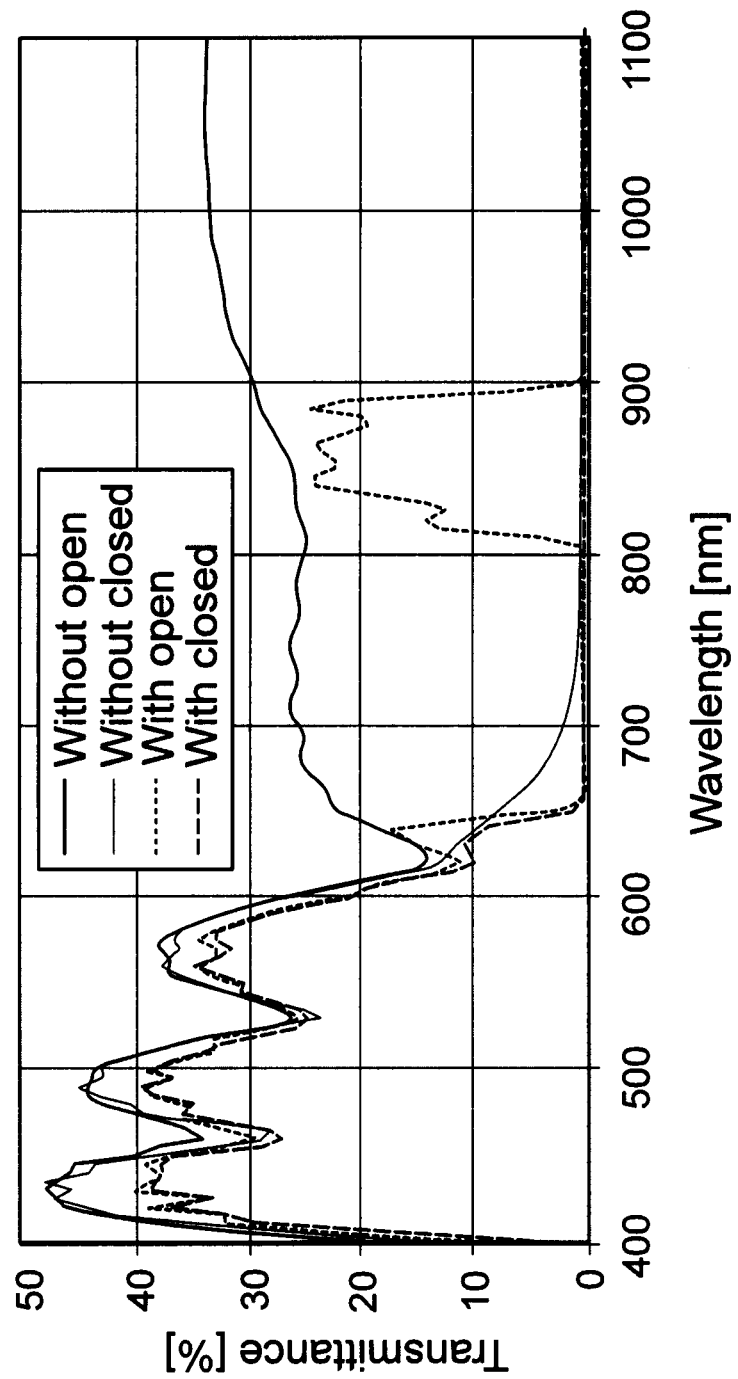
FIG. 6 shows four optical response transmittance curves representing closed and open light states of the optical shutter of FIG. 1, different pairs of the four curves representing the closed and open light states when the multiple-bandpass filter component is positioned in and removed from the optical shutter.

FIG. 6 shows optical response transmittance curves representing the optical switching characteristics of an actual optical shutter 10. The optical response transmittance curves represent closed and open light states of optical shutter 10 when multiple-bandpass filter 24 is positioned in and removed from optical shutter 10.

With reference to FIG. 6, the two dashed-line curves represent the closed light state (longer dashes) and the open light state (shorter dashes) when multiple-bandpass filter 24 is positioned in optical shutter 10. The dashed-line curve representing the closed light state corresponds to optical response characteristic 80 in FIG. 5A, and the dashed-line curve representing the open light state corresponds to optical response characteristic 82 in FIG. 5B. The two solid-line curves represent the closed light state (thiner line) and the open light state (thicker line) when multiple-bandpass filter 24 is removed from optical shutter 10.

It will be obvious to those having skill in the art that many changes may be made to the details of the above-described embodiments without departing from the underlying principles of the invention. For example, light sensor 12 can be of a CMOS type. The scope of the present invention should, therefore, be determined only by the following claims.

The invention claimed is:

1. A near-infrared optical shutter for use with an optical instrument that in operation receives light in visible and near-infrared wavelength regions of an electromagnetic radiation spectrum of frequencies characterizing light and that includes a light detection sensor characterized by spectral light sensitivity in which a near-infrared light sensor band region has a shorter wavelength boundary and a longer wavelength boundary, the shorter wavelength boundary being located adjacent the visible light region of the electromagnetic radiation spectrum, the optical shutter comprising:

a multiple-bandpass filter characterized by a bandstop filter region located between a first bandpass filter region and a second bandpass filter region, the first bandpass filter region passing visible light wavelengths, the bandstop filter region blocking near-infrared light of wavelengths within the near-infrared light sensor band region, and the second bandpass filter region passing near-infrared light of longer wavelengths than the wavelength of the longer wavelength boundary of the near-infrared light sensor band region;

first and second near-infrared polarizing filters that are tuned to pass visible light wavelengths in the first bandpass filter region and near-infrared light wavelengths in the second bandpass filter region; and a polarization state changer positioned between the first and second near-infrared polarizing filters and optically associated with the multiple-bandpass filter, the polarization state changer responsive to a control signal to provide selectively one of a first light state and a second light state, the polarization state changer in the first light state causing transmission of visible light wavelengths in the first bandpass filter region and substantially reducing transmission of near-infrared light wavelengths in the second bandpass filter region from the optical shutter, and in the second light state causing transmission of visible light wavelengths in the first bandpass filter region and substantially increasing transmission of near-infrared light wavelengths in the second bandpass filter region from the optical shutter.

2. The near-infrared optical shutter of claim 1, in which the light detection sensor includes a charge-coupled device image sensor.

3. The near-infrared optical shutter of claim 2, in which the optical instrument is a digital camera.

4. The near-infrared optical shutter of claim 1, in which the shorter and longer wavelength boundaries of the near-infrared light sensor band region are about 700 nm and about 800 nm, respectively.

5. The near-infrared optical shutter of claim 1, in which the multiple-bandpass filter is of a static dual bandpass filter type.

6. The near-infrared optical shutter of claim 1, in which the first and second bandpass filter regions pass light wavelengths within, respectively, a range of between about 400 nm and about 700 nm and a range of between about 800 nm and about 900 nm.

7. The near-infrared optical shutter of claim 6, in which the bandstop filter region blocks light wavelengths within a range of between about 700 nm and about 800 nm.

8. The near-infrared optical shutter of claim 1, in which the first and second near-infrared polarizing filters are of a wavelength selective type that imparts a polarization state to incident near-infrared light wavelengths but not to incident visible light wavelengths.

9. The near-infrared optical shutter of claim 8, in which the first and second near-infrared polarizing filters are of a wire-grid type.

10. The near-infrared optical shutter of claim 1, in which the polarization state changer includes a liquid crystal device.

11. The near-infrared optical shutter of claim 10, in which the liquid crystal device is of a twisted nematic type.

12. The near-infrared optical shutter of claim 10, in which the second bandpass filter region has a center wavelength, and in which the liquid crystal device is a 90°-twisted nematic device tuned for a first minimum condition at the center wavelength of the second bandpass filter region.

13. The near-infrared optical shutter of claim 1, in which the first light state represents a strong ambient light environment corresponding to operation of the optical shutter in daytime conditions, and in which the second light state represents a weak ambient light environment corresponding to operation of the optical shutter in nighttime conditions.

\* \* \* \* \*